United States Patent
Yu et al.

(10) Patent No.: US 11,265,806 B2
(45) Date of Patent: Mar. 1, 2022

(54) DETERMINING DISCOVERY ANNOUNCEMENT POOL

(71) Applicant: Lenovo (Beijing) Limited, Beijing (CN)

(72) Inventors: Xiaodong Yu, Beijing (CN); Zhi Yan, Beijing (CN); Chenxi Zhu, Beijing (CN); Lianhai Wu, Beijing (CN); Haipeng Lei, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 0 days.

(21) Appl. No.: 16/757,574

(22) PCT Filed: Oct. 18, 2017

(86) PCT No.: PCT/CN2017/106664
§ 371 (c)(1),
(2) Date: Apr. 20, 2020

(87) PCT Pub. No.: WO2019/075653
PCT Pub. Date: Apr. 25, 2019

(65) Prior Publication Data
US 2020/0359304 A1    Nov. 12, 2020

(51) Int. Cl.
*H04W 48/16* (2009.01)
*H04W 8/00* (2009.01)
(Continued)

(52) U.S. Cl.
CPC ........... *H04W 48/16* (2013.01); *H04W 8/005* (2013.01); *H04W 8/245* (2013.01); *H04W 24/08* (2013.01); *H04W 88/04* (2013.01); *H04W 88/085* (2013.01)

(58) Field of Classification Search
CPC ..... H04W 48/16; H04W 8/005; H04W 8/245; H04W 24/08; H04W 88/04;
(Continued)

(56) References Cited

U.S. PATENT DOCUMENTS

2018/0014174 A1   1/2018  Zhou et al.
2020/0178343 A1*  6/2020  Kim ...................... H04W 76/18

FOREIGN PATENT DOCUMENTS

CN   106793154 A   5/2017
EP     3119012 A1   1/2017
(Continued)

OTHER PUBLICATIONS

Intel Corporation, "Sidelink Discovery Enhancements for Wearable and IoT Use Cases", 3GPP TSG RAN WG1 Meeting #89 R1-1707331, May 15-19, 2017, pp. 1-6.
(Continued)

*Primary Examiner* — Diane D Mizrahi
(74) *Attorney, Agent, or Firm* — Kunzler Bean & Adamson

(57) ABSTRACT

Apparatuses, methods, and systems are disclosed for determining a discovery announcement pool. One method (600) includes receiving (602) multiple discovery announcement pools. The multiple discovery announcement pools include different discovery signal transmission bandwidths, different numbers of transmission subframes, or a combination thereof. The method (600) includes determining (604) a first discovery announcement pool of the multiple discovery announcement pools. The method (600) includes transmitting (606) a discovery announcement signal using the first discovery announcement pool.

20 Claims, 6 Drawing Sheets

(51) Int. Cl.
*H04W 8/24* (2009.01)
*H04W 24/08* (2009.01)
*H04W 88/04* (2009.01)
*H04W 88/08* (2009.01)

(58) Field of Classification Search
CPC ........... H04W 88/085; H04W 52/0216; H04W 52/0229; H04W 48/10; Y02D 30/70
See application file for complete search history.

(56) References Cited

FOREIGN PATENT DOCUMENTS

| | | |
|---|---|---|
| WO | 2016/145677 A1 | 9/2016 |
| WO | 2016161623 A1 | 10/2016 |

OTHER PUBLICATIONS

International Application No. PCT/CN2017/106664, "Notification of Transmittal of the International Search Report and the Written Opinion of the International Searching Authority, or the Declaration" dated Jul. 6, 2018, pp. 1-9.

LG Electronics. "Discovery enhancement for IoT and wearables", 3GPP TSG RAN WG1 Meeting #88bis R1-1704858, Apr. 3-7, 2017. pp. 1-4.

LG Electronics. "Discussion on discovery enhancement for IoT and wearables", 3GPP TSG RAN WG1 Meeting #89 R1-1707582, May 15-19, 2017, pp. 1-6.

3GPP, "3rd Generation Partnership Project; Technical Specification Group Radio Access Network; Evolved Universal Terrestrial Radio Access (E-UTRA); Requirements for support of radio resource management (Release 15)", 3GPP TS 36.133 V15.0.0, Sep. 2017, pp. 1-2663.

3GPP, "3rd Generation Partnership Project; Technical Specification Group Radio Access Network; Evolved Universal Terrestrial Radio Access (E-UTRA); Physical layer procedures (Release 14)", 3GPP TS 36.213 V14.4.0, Sep. 2017, pp. 1-462.

3GPP, "3rd Generation Partnership Project; Technical Specification Group Radio Access Network; Evolved Universal Terrestrial Radio Access (E-UTRA); Radio Resource Control (RRC); Protocol specification (Release 14)", 3GPP TS 36.331 V14.3.0, Jun. 2017, pp. 1-745.

3GPP, "3rd Generation Partnership Project; Technical Specification Group Radio Access Network; Evolved Universal Terrestrial Radio Access (E-UTRA); User Equipment (UE) procedures in idle mode (Release 14)", 3GPP TS 36.304 V14.4.0, Sep. 2017, pp. 1-49.

* cited by examiner

DETERMINING DISCOVERY ANNOUNCEMENT POOL

FIELD

The subject matter disclosed herein relates generally to wireless communications and more particularly relates to determining a discovery announcement pool.

BACKGROUND

The following abbreviations are herewith defined, at least some of which are referred to within the following description: Third Generation Partnership Project ("3GPP"), Positive-Acknowledgment ("ACK"), Binary Phase Shift Keying ("BPSK"), Clear Channel Assessment ("CCA"), Control Element ("CE"), Cyclic Prefix ("CP"), cyclical Redundancy Check ("CRC"), Channel State Information ("CSI"), Common Search Space ("CSS"), Discrete Fourier Transform Spread ("DFTS"), Downlink Control Information ("DCI"), Downlink ("DL"), Downlink Pilot Time Slot ("DwPTS"), Enhanced clear Channel Assessment ("eCCA"), Enhanced Mobile Broadband ("eMBB"), Evolved Node B ("eNB"), European Telecommunications Standards Institute ("ETSI"), Frame Based Equipment ("FBE"), Frequency Division Duplex ("FDD"), Frequency Division Multiple Access ("FDMA"), Frequency Division Orthogonal Cover Code ("FD-OCC"), Guard Period ("GP"), Hybrid Automatic Repeat Request ("HARQ"), Internet-of-Things ("IoT"), Licensed Assisted Access ("LAA"), Load Based Equipment ("LBE"), Listen-Before-Talk ("LBT"), Long Term Evolution ("LTE"), Multiple Access ("MA"), Medium Access Control ("MAC"), Modulation Coding Scheme ("MCS"), Machine Type Communication ("MTC"), Multiple Input Multiple Output ("MIMO"), Multi User Shared Access ("MUSA"), Narrowband ("NB"), Negative-Acknowledgment ("NACK") or ("NAK"), Next Generation Node B ("gNB"), Non-Orthogonal Multiple Access ("NOMA"), Orthogonal Frequency Division Multiplexing ("OFDM"), Primary Cell ("PCell"), Physical Broadcast Channel ("PBCH"), Physical Downlink Control Channel ("PDCCH"), Physical Downlink Shared Channel ("PDSCH"), Pattern Division Multiple Access ("PDMA"), Physical Hybrid ARQ Indicator Channel ("PHICH"), Public Land Mobile Network ("PLMN"), Physical Random Access Channel ("PRACH"), Physical Resource Block ("PRB"), Physical Uplink Control Channel ("PUCCH"), Physical Uplink Shared Channel ("PUSCH"), Quality of Service ("QoS"), Quadrature Phase Shift Keying ("QPSK"), Resource Element ("RE"), Radio Resource Control ("RRC"), Random Access Procedure ("RACH"), Random Access Response ("RAR"), Radio Link Failure ("RLF"), Radio Network Temporary Identifier ("RNTI"), Reference Signal ("RS"), Remaining Minimum System Information ("RMSI"), Resource Spread Multiple Access ("RSMA"), Reference Signal Received Power ("RSRP"), Round Trip Time ("RTT"), Receive ("RX"), Sparse Code Multiple Access ("SCMA"), Scheduling Request ("SR"), Single Carrier Frequency Division Multiple Access ("SC-FDMA"), Secondary Cell ("SCell"), Shared Channel ("SCH"), Signal-to-Interference-Plus-Noise Ratio ("SINR"), System Information Block ("SIB"), Synchronization Signal ("SS"), Transport Block ("TB"), Transport Block Size ("TBS"), Time-Division Duplex ("TDD"), Time Division Multiplex ("TDM"), Time Division Orthogonal Cover Code ("TD-OCC"), Transmission Time Interval ("TTI"), Transmit ("TX"), Uplink Control Information ("UCI"), User Entity/Equipment (Mobile Terminal) ("UE"), Uplink ("UL"), Universal Mobile Telecommunications System ("UMTS"), Uplink Pilot Time Slot ("UpPTS"), Ultra-reliability and Low-latency Communications ("URLLC"), and Worldwide Interoperability for Microwave Access ("WiMAX"). As used herein, "HARQ-ACK" may represent collectively the Positive Acknowledge ("ACK") and the Negative Acknowledge ("NACK"). ACK means that a TB is correctly received while NACK (or NAK) means a TB is erroneously received.

In certain wireless communications networks, devices may have a capability to transmit and/or receive data having a bandwidth greater than one PRB in a single subframe. However, other wireless communication networks may be unable to transmit and/or receive data having a bandwidth greater than one PRB in a single subframe.

BRIEF SUMMARY

Methods for determining a discovery announcement pool are disclosed. Apparatuses and systems also perform the functions of the method. In one embodiment, the method includes receiving multiple discovery announcement pools. In such an embodiment, the multiple discovery announcement pools include different discovery signal transmission bandwidths, different numbers of transmission subframes, or a combination thereof. In certain embodiments, the method includes determining a first discovery announcement pool of the multiple discovery announcement pools. In some embodiments, the method includes transmitting a discovery announcement signal using the first discovery announcement pool.

In one embodiment, determining the first discovery announcement pool includes determining the first discovery announcement pool based on operational information. In a further embodiment, the operational information includes indication information received from a base unit, a remote unit capability, a remote unit power limitation, a remote unit power consumption requirement, a discovery signal coverage distance, a traffic type of subsequent data, a service type of subsequent data, a traffic priority of subsequent data, or some combination thereof. In certain embodiments, the method includes monitoring for a response to the discovery announcement signal. In various embodiments, monitoring for the response to the discovery announcement signal includes monitoring for the response to the discovery announcement signal using a discovery monitor pool. In some embodiments, the discovery monitor pool is determined from multiple discovery monitor pools based on configuration information received from a base unit.

In certain embodiments, the discovery monitor pool is determined from multiple discovery monitor pools based on an association between the discovery monitor pool and the discovery announcement pool. In some embodiments, monitoring for the response to the discovery announcement signal includes monitoring communication from a base unit for the response to the discovery announcement signal.

In various embodiments, the method includes determining a second discovery announcement pool of the multiple discovery announcement pools in response to not receiving a response to the discovery announcement signal and in response to one or more conditions being satisfied. In certain embodiments, the one or more conditions include not receiving a response to the discovery announcement signal after transmitting the discovery announcement signal using the first discovery announcement pool a predetermined number of times, not receiving a response to the discovery announcement signal after a predetermined period of time, or a combination thereof. In some embodiments, the second discovery announcement pool is configured based on operational information.

In certain embodiments, the operational information includes indication information received from a base unit, a remote unit capability, a remote unit power limitation, a remote unit power consumption requirement, a discovery signal coverage distance, a traffic type of subsequent data, a service type of subsequent data, a traffic priority of subsequent data, or some combination thereof.

An apparatus for determining a discovery announcement pool, in one embodiment, includes a receiver that receives multiple discovery announcement pools. In such an embodiment, the multiple discovery announcement pools include different discovery signal transmission bandwidths, different numbers of transmission subframes, or a combination thereof. In various embodiments, the apparatus includes a processor that determines a first discovery announcement pool of the multiple discovery announcement pools. In some embodiments, the apparatus includes a transmitter that transmits a discovery announcement signal using the first discovery announcement pool.

Another method for determining a discovery announcement pool includes receiving multiple discovery announcement pools. In such an embodiment, the multiple discovery announcement pools include different discovery signal transmission bandwidths, different numbers of transmission subframes, or a combination thereof. In certain embodiments, the method includes receiving a discovery announcement signal using a first discovery announcement pool of the multiple discovery announcement pools.

In one embodiment, the first discovery announcement pool is determined based on operational information. In a further embodiment, the operational information includes indication information received from a base unit, a remote unit capability, a remote unit power limitation, a remote unit power consumption requirement, a discovery signal coverage distance, a traffic type of subsequent data, a service type of subsequent data, a traffic priority of subsequent data, or some combination thereof. In certain embodiments, the method includes transmitting a response to the discovery announcement signal. In various embodiments, transmitting the response to the discovery announcement signal includes transmitting the response to the discovery announcement signal using a discovery monitor pool. In some embodiments, the discovery monitor pool is determined from multiple discovery monitor pools based on configuration information received from a base unit.

In certain embodiments, the discovery monitor pool is determined from multiple discovery monitor pools based on an association between the discovery monitor pool and the discovery announcement pool. In some embodiments, transmitting the response to the discovery announcement signal includes transmitting the response to the discovery announcement signal to a base unit.

An apparatus for determining a discovery announcement pool, in one embodiment, includes a receiver that receives multiple discovery announcement pools. In such an embodiment, the multiple discovery announcement pools include different discovery signal transmission bandwidths, different numbers of transmission subframes, or a combination thereof. In various embodiments, the receiver receives a discovery announcement signal using a first discovery announcement pool of the multiple discovery announcement pools.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
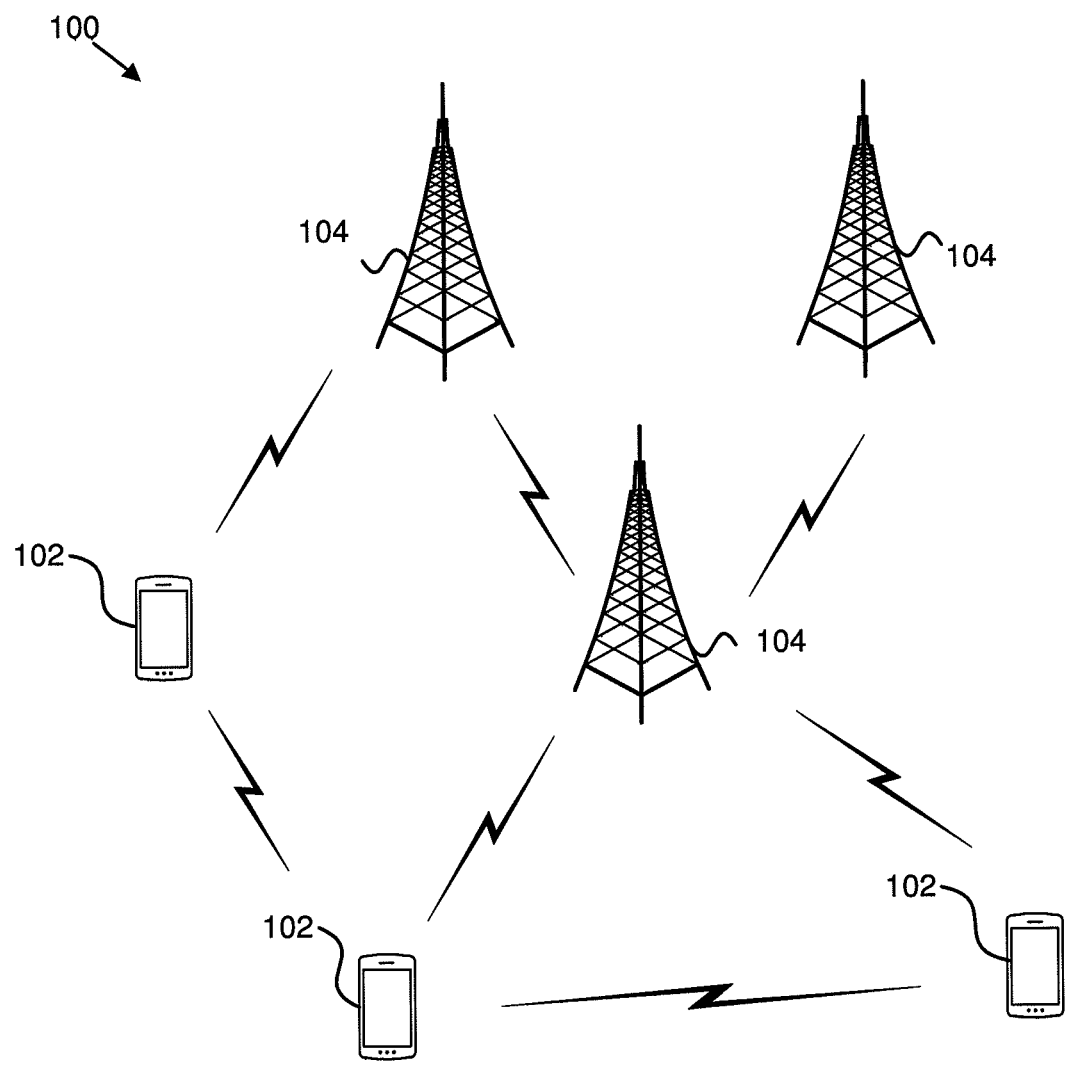
FIG. 1 is a schematic block diagram illustrating one embodiment of a wireless communication system for determining a discovery announcement pool.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks. The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for determining a discovery announcement pool. In one embodiment, the wireless communication system 100 includes remote units 102 and base units 104. Even though a specific number of remote units 102 and base units 104 are depicted in FIG. 1, one of skill in the art will recognize that any number of remote units 102 and base units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the base units 104 via UL communication signals. Moreover, the remote units 102 may communicate directly with other remote units 102, such as via sidelink communication.

The base units 104 may be distributed over a geographic region. In certain embodiments, a base unit 104 may also be referred to as an access point, an access terminal, a base, a base station, a Node-B, an eNB, a gNB, a Home Node-B, a relay node, a device, a core network, an aerial server, or by any other terminology used in the art. The base units 104 are generally part of a radio access network that includes one or more controllers communicably coupled to one or more corresponding base units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with the 3GPP protocol, wherein the base unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, among other protocols. The present disclosure is not intended to be limited to the implementation of any particular wireless communication system architecture or protocol.

The base units 104 may serve a number of remote units 102 within a serving area, for example, a cell or a cell sector via a wireless communication link. The base units 104 transmit DL communication signals to serve the remote units 102 in the time, frequency, and/or spatial domain.

In one embodiment, a remote unit 102 may receive multiple discovery announcement pools. In such an embodiment, the multiple discovery announcement pools may include different discovery signal transmission bandwidths, different numbers of transmission subframes, or a combination thereof. In certain embodiments, the remote unit 102 may determine a first discovery announcement pool of the multiple discovery announcement pools. In some embodiments, the remote unit 102 may transmit a discovery announcement signal using the first discovery announcement pool. Accordingly, a remote unit 102 may be used for determining a discovery announcement pool.

In another embodiment, a remote unit 102 may receive multiple discovery announcement pools. In such an embodiment, the multiple discovery announcement pools may include different discovery signal transmission bandwidths, different numbers of transmission subframes, or a combination thereof. In certain embodiments, the remote unit 102 may receive a discovery announcement signal (e.g., from another remote unit 102 via sidelink communication) using a first discovery announcement pool of the multiple discovery announcement pools. Accordingly, a remote unit 102 may be used for determining a discovery announcement pool. In some embodiments, a base unit 102 may be used for transmitting multiple discovery announcement pools.

Figure 2:
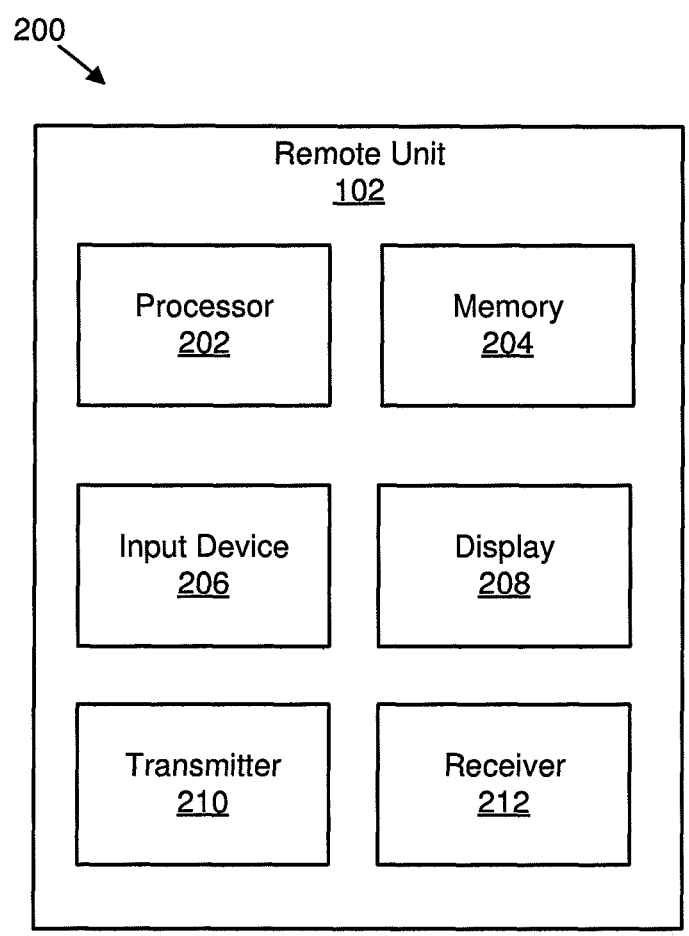
FIG. 2 is a schematic block diagram illustrating one embodiment of an apparatus that may be used for determining a discovery announcement pool.

FIG. 2 depicts one embodiment of an apparatus 200 that may be used for determining a discovery announcement pool. The apparatus 200 includes one embodiment of the remote unit 102. The remote unit 102 may be considered a remote UE and/or a relay UE. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. In certain embodiments, the processor 202 may determine a first discovery announcement pool of the multiple discovery announcement pools. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102. In one embodiment, the memory 204 receives data at a buffer at a first time.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the base unit 104 and the receiver 212 is used to receive DL communication signals from the base unit 104. In various embodiments, the receiver 212 may be used to receive multiple discovery announcement pools. In such embodiments, the multiple discovery announcement pools may include different discovery signal transmission bandwidths, different numbers of transmission subframes, or a combination thereof. In one embodiment, the transmitter 210 may be used to transmit a discovery announcement signal using a determined a first discovery announcement pool of the multiple discovery announcement pools. In certain embodiments, the receiver 212 may be used to receive a discovery announcement signal using a first discovery announcement pool of the multiple discovery announcement pools. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

In certain embodiments, the remote unit 102 may perform a variety of functions that facilitate the remote unit 102 determining a discovery announcement pool to use. The remote unit 102 may function as a remote UE and/or a relay UE using sidelink transmissions.

In one embodiment of a first function, a base unit 104 may configure multiple discovery announcement pools for a remote unit 102 for sidelink transmission and/or reception. Each discovery announcement pool may indicate resources used by the discovery announcement pool. Moreover, each discovery announcement pool may be used for transmitting a discovery announcement signal. In various embodiments, the discovery announcement signal may include a proximity service application identification ("ID"), a proximity service application code, a PLMN ID, a type of discovery message, a remote unit 102 mode of operation, status bits, a destination ID, a source ID, and so forth. In some embodiments, the multiple discovery announcement pools may have different transmission bandwidths and/or a different number of transmission subframes. For example, the multiple discovery announcement pools may be configured similarly to one of the following: 1 PRB spanning 2 continuous and/or non-continuous subframes; ½ PRB spanning 4 continuous and/or non-continuous subframes; ¼ PRB spanning 8 continuous and/or non-continuous subframes; ⅙ PRB spanning 12 continuous and/or non-continuous subframes; and/or ¹⁄₁₂ PRB spanning 24 continuous and/or non-continuous subframes.

In certain embodiments of a second function, a remote unit 102 may determine a discovery announcement pool out of multiple configured discovery announcement pools based on: indication information from a base unit 104 (e.g., indication information in downlink control physical layer signaling and/or higher layer signaling); the remote unit's 102 capability; the remote unit's 102 transmission power limitation; the remote unit's 102 power consumption requirement; a desired discovery signal coverage distance; a traffic type (e.g., of subsequent data); a service type (e.g., of subsequent data); and/or a traffic priority (e.g., of subsequent data).

In some embodiments of a third function, a remote unit 102 may transmit a discovery announcement signal in a determined discovery announcement transmission pool.

In various embodiments of a fourth function, after transmitting discovery announcement signal, a remote unit 102 may expect to receive a discovery response in a monitored discovery announcement pools; therefore, the remote unit 102 may monitor for the discovery response. The discovery response may indicate that the discovery announcement signal was received by another remote unit 102. The discovery response may be received directly by another remote unit 102 and/or indirectly from another remote unit 102 (e.g., by another remote unit 102 transmitting a discovery response to a base unit 104, and the base unit 104 transmitting the discovery response to the remote unit 102 that transmitted the discovery announcement signal). In certain embodiments, the monitored discovery announcement pools (or discovery monitor pools) may be configured by a base unit 104 and/or the monitored discovery announcement pools may be associated with discovery announcement pools (e.g., via specification, configuration, etc.).

In some embodiments, if the remote unit 102 that transmitted the discovery announcement signal doesn't receive a response in monitored discovery announcement pools and one or more condition are satisfied, the remote unit 102 may reselect a discovery announcement pool from the configured multiple discovery announcement pools and may retransmit a discovery announcement signal in the reselected discovery announcement pool.

A first condition that may be satisfied may include the remote unit 102 not receiving a discovery response in response to a number of times that the remote unit 102 has transmitted the discovery announcement signal in one discovery announcement transmission pool exceeding a predefined threshold (e.g., a maximum number of times transmitted). For example, in response to a remote unit 102 transmitting a discovery announcement signal in a discovery announcement transmission pool having a 1 PRB bandwidth and spanning 2 continuous and/or non-continuous subframes two times, and the remote unit 102 not receiving feedback in response to transmitting the discovery announcement signal, the remote unit 102 may select a new discovery announcement transmission pool having a ¼ PRB bandwidth and spanning 8 continuous and/or non-continuous subframes two times. As may be appreciated, a selection order for selecting a discovery announcement transmission pool and/or a maximum number of times transmitted may be configured by a base unit 104 and/or determined by the remote unit 102 based: indication information from a base unit 104 (e.g., indication information in downlink control physical layer signaling and/or higher layer signaling); the remote unit's 102 capability; the remote unit's 102 transmission power limitation; the remote unit's 102 power consumption requirement; a desired discovery signal coverage distance; a traffic type (e.g., of subsequent data); a service type (e.g., of subsequent data); and/or a traffic priority (e.g., of subsequent data).

A second condition that may be satisfied may include the remote unit 102 not receiving a discovery response during a fixed and/or preconfigured threshold time (e.g., 50 ms, 100 ms, 200 ms, etc.). In various embodiments, the first condition and/or the second condition may be associated with a discovery announcement transmission pool by configuration from a base unit 104 and/or predetermined (e.g., fixed in a specification).

Figure 3:
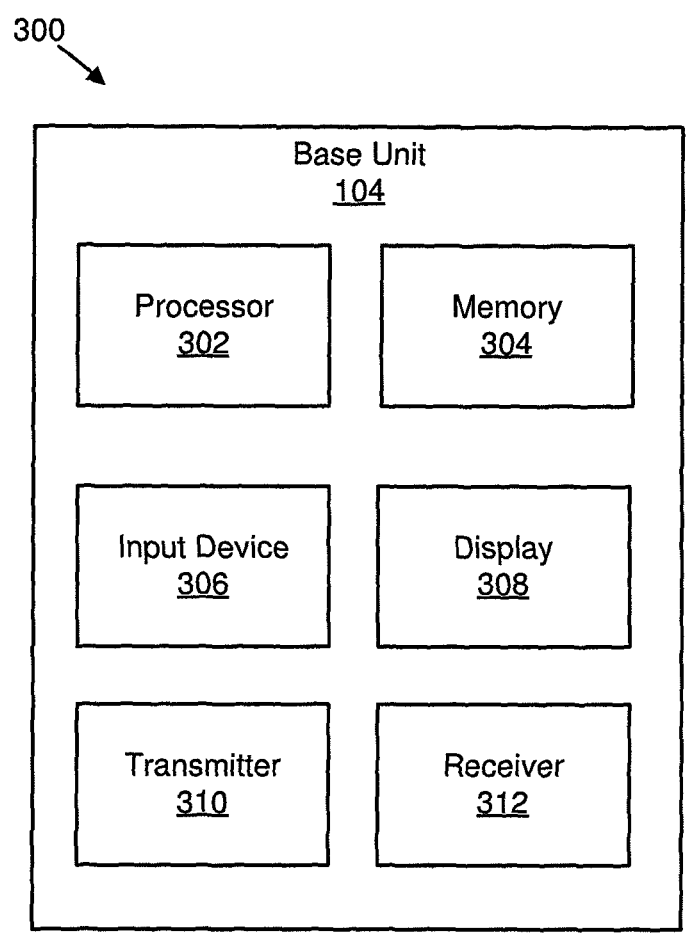
FIG. 3 is a schematic block diagram illustrating one embodiment of an apparatus that may be used for transmitting multiple discovery announcement pools.

FIG. 3 depicts one embodiment of an apparatus 300 that may be used for transmitting multiple discovery announcement pools. The apparatus 300 includes one embodiment of the base unit 104. Furthermore, the base unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In some embodiments, the transmitter 310 may be used to transmit multiple discovery announcement pools. In such embodiments, the multiple discovery announcement pools may include different discovery signal transmission bandwidths, different numbers of transmission subframes, or a combination thereof. Although only one transmitter 310 and one receiver 312 are illustrated, the base unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

Figure 4:
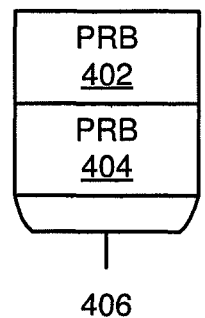
FIG. 4 is a block diagram illustrating one embodiment of a communication structure.

FIG. 4 is a block diagram illustrating one embodiment of a communication structure 400. The communication structure 400 includes a first PRB 402 and a second PRB 404 transmitted in a single subframe 406. In some embodiments, a remote unit 102 may be capable of transmitting and/or receiving data having a structure similar to the communication structure 400 (e.g., having a bandwidth greater than one PRB in a single subframe).

Figure 5:
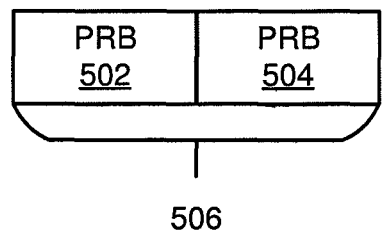
FIG. 5 is a block diagram illustrating another embodiment of a communication structure.

FIG. 5 is a block diagram illustrating another embodiment of a communication structure 500. The communication structure 500 includes a first PRB 502 and a second PRB 504 transmitted in two subframes 506. In various embodiments, a remote unit 102 may be capable of transmitting and/or receiving data having a structure similar to the communication structure 500 (e.g., having a bandwidth less than or equal to one PRB in two or more subframes). In certain embodiments, the communication structure 500 may be used by a bandwidth limited UE (e.g., the remote unit 102 described herein), such as a remote UE that is a NB-IoT device having a maximum bandwidth of one PRB. The bandwidth limited UE may not be capable of detecting and decoding the communication structure 400. Furthermore, the bandwidth limited UE may not be capable of transmitting the communication structure 400. In some embodiments, the communication structure 500 may be used for a discovery signal and/or its corresponding discovery monitoring and/or announcement pool. Accordingly, by the communication structure 500 having less transmission bandwidth than the communication structure 400, higher transmission power spectrum density of a bandwidth limited UE may be possible. In some embodiments, a discovery signal transmitted by a remote UE may be received and detected by a relay UE at a greater distance because of the higher power spectrum density. In various embodiments, a different level of discovery coverage corresponding to a different level of discovery transmission bandwidth may facilitate avoiding collision among multiple remote UEs at a relay UE side.

Figure 6:
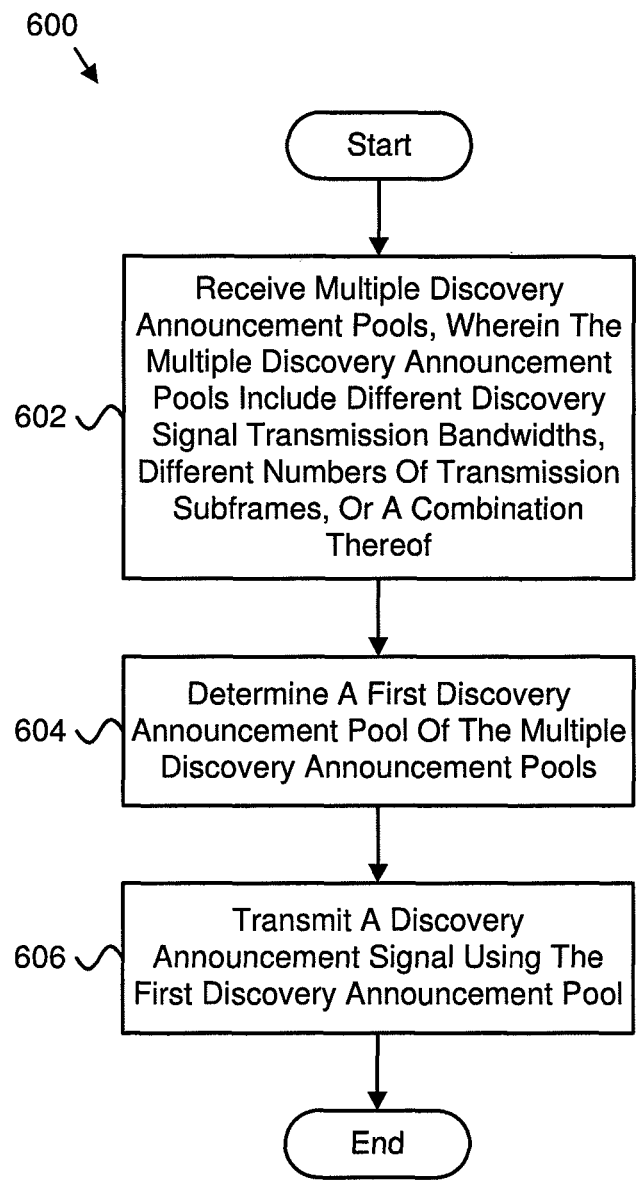
FIG. 6 is a schematic flow chart diagram illustrating one embodiment of a method for determining a discovery announcement pool.

FIG. 6 is a schematic flow chart diagram illustrating one embodiment of a method 600 for determining a discovery announcement pool. In some embodiments, the method 600 is performed by an apparatus, such as the remote unit 102. In certain embodiments, the method 600 may be performed by a processor executing program code, for example, a microcontroller, a microprocessor, a CPU, a GPU, an auxiliary processing unit, a FPGA, or the like.

The method 600 may include receiving 602 multiple discovery announcement pools. In such an embodiment, the multiple discovery announcement pools may include different discovery signal transmission bandwidths, different numbers of transmission subframes, or a combination thereof. In certain embodiments, the method 600 includes determining 604 a first discovery announcement pool of the multiple discovery announcement pools. In some embodiments, the method 600 includes transmitting 606 a discovery announcement signal using the first discovery announcement pool.

In one embodiment, determining the first discovery announcement pool includes determining the first discovery announcement pool based on operational information. In a further embodiment, the operational information includes indication information received from a base unit, a remote unit capability, a remote unit power limitation, a remote unit power consumption requirement, a discovery signal coverage distance, a traffic type of subsequent data, a service type of subsequent data, a traffic priority of subsequent data, or some combination thereof. In certain embodiments, the method 600 includes monitoring for a response to the discovery announcement signal. In various embodiments, monitoring for the response to the discovery announcement signal includes monitoring for the response to the discovery announcement signal using a discovery monitor pool. In some embodiments, the discovery monitor pool is determined from multiple discovery monitor pools based on configuration information received from a base unit.

In certain embodiments, the discovery monitor pool is determined from multiple discovery monitor pools based on an association between the discovery monitor pool and the discovery announcement pool. In some embodiments, monitoring for the response to the discovery announcement signal includes monitoring communication from a base unit for the response to the discovery announcement signal.

In various embodiments, the method 600 includes determining a second discovery announcement pool of the multiple discovery announcement pools in response to not receiving a response to the discovery announcement signal and in response to one or more conditions being satisfied. In certain embodiments, the one or more conditions include not receiving a response to the discovery announcement signal after transmitting the discovery announcement signal using the first discovery announcement pool a predetermined number of times, not receiving a response to the discovery announcement signal after a predetermined period of time, or a combination thereof. In some embodiments, the second discovery announcement pool is configured based on operational information.

In certain embodiments, the operational information includes indication information received from a base unit, a remote unit capability, a remote unit power limitation, a remote unit power consumption requirement, a discovery signal coverage distance, a traffic type of subsequent data, a service type of subsequent data, a traffic priority of subsequent data, or some combination thereof.

Figure 7:
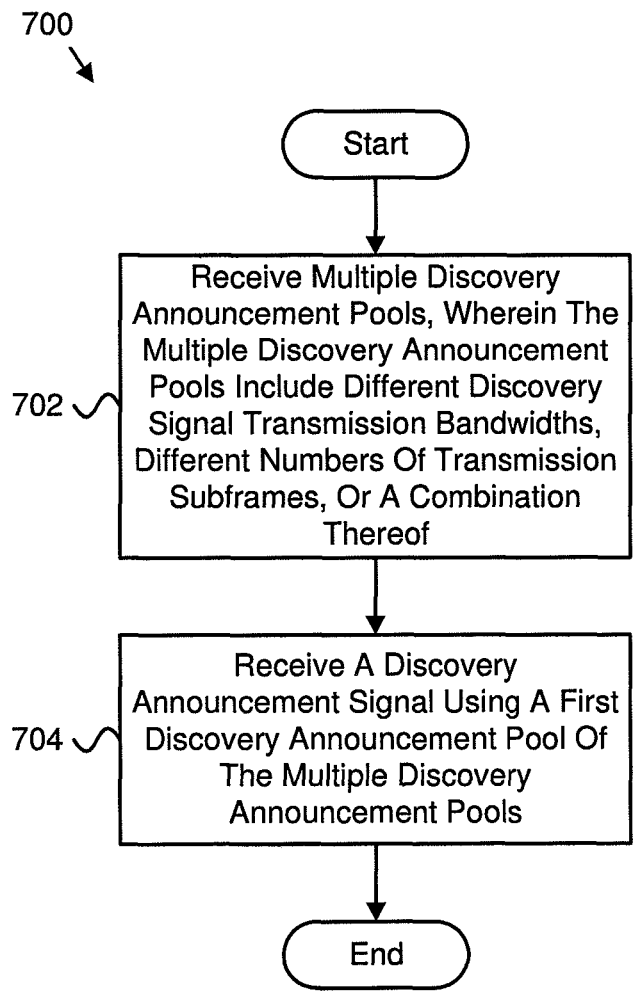
FIG. 7 is a schematic flow chart diagram illustrating another embodiment of a method for determining a discovery announcement pool.

FIG. 7 is a schematic flow chart diagram illustrating another embodiment of a method 700 for determining a discovery announcement pool. In some embodiments, the method 700 is performed by an apparatus, such as the remote unit 102. In certain embodiments, the method 700 may be performed by a processor executing program code, for example, a microcontroller, a microprocessor, a CPU, a GPU, an auxiliary processing unit, a FPGA, or the like.

The method 700 may include receiving 702 multiple discovery announcement pools. In such an embodiment, the multiple discovery announcement pools may include different discovery signal transmission bandwidths, different numbers of transmission subframes, or a combination thereof. In certain embodiments, the method 700 includes receiving 704 a discovery announcement signal using a first discovery announcement pool of the multiple discovery announcement pools.

In one embodiment, the first discovery announcement pool is determined based on operational information. In a further embodiment, the operational information includes indication information received from a base unit, a remote unit capability, a remote unit power limitation, a remote unit power consumption requirement, a discovery signal coverage distance, a traffic type of subsequent data, a service type of subsequent data, a traffic priority of subsequent data, or some combination thereof. In certain embodiments, the method 700 includes transmitting a response to the discovery announcement signal. In various embodiments, transmitting the response to the discovery announcement signal includes transmitting the response to the discovery announcement signal using a discovery monitor pool. In some embodiments, the discovery monitor pool is determined from multiple discovery monitor pools based on configuration information received from a base unit.

In certain embodiments, the discovery monitor pool is determined from multiple discovery monitor pools based on an association between the discovery monitor pool and the discovery announcement pool. In some embodiments, transmitting the response to the discovery announcement signal includes transmitting the response to the discovery announcement signal to a base unit.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method comprising:
receiving a plurality of discovery announcement pools, wherein each discovery announcement pool of the plurality of discovery announcement pools comprises a discovery signal transmission bandwidth that has a different discovery signal transmission bandwidth than all other discovery announcement pools of the plurality of discovery announcement pools and a number of transmission subframes that has a different number of transmission subframes than all other discovery announcement pools of the plurality of discovery announcement pools;
determining a first discovery announcement pool of the plurality of discovery announcement pools; and
transmitting a discovery announcement signal using the first discovery announcement pool.

2. The method of claim 1, wherein determining the first discovery announcement pool comprises determining the first discovery announcement pool based on operational information.

3. The method of claim 2, wherein the operational information comprises indication information received from a base unit, a remote unit capability, a remote unit power limitation, a remote unit power consumption requirement, a discovery signal coverage distance, a traffic type of subsequent data, a service type of subsequent data, a traffic priority of subsequent data, or some combination thereof.

4. An apparatus comprising:
a receiver that receives a plurality of discovery announcement pools, wherein each discovery announcement pool of the plurality of discovery announcement pools comprises a discovery signal transmission bandwidth that has a different discovery signal transmission bandwidth than all other discovery announcement pools of the plurality of discovery announcement pools and a number of transmission subframes that has a different number of transmission subframes than all other discovery announcement pools of the plurality of discovery announcement pools;
a processor that determines a first discovery announcement pool of the plurality of discovery announcement pools; and
a transmitter that transmits a discovery announcement signal using the first discovery announcement pool.

5. The apparatus of claim 4, wherein the processor determining the first discovery announcement pool comprises the processor determining the first discovery announcement pool based on operational information.

6. The apparatus of claim 5, wherein the operational information comprises indication information received from a base unit, a remote unit capability, a remote unit power limitation, a remote unit power consumption requirement, a discovery signal coverage distance, a traffic type of subsequent data, a service type of subsequent data, a traffic priority of subsequent data, or some combination thereof.

7. The apparatus of claim 4, wherein the processor monitors for a response to the discovery announcement signal.

8. The apparatus of claim 7, wherein the processor monitoring for the response to the discovery announcement signal comprises the processor monitoring for the response to the discovery announcement signal using a discovery monitor pool.

9. The apparatus of claim 8, wherein the discovery monitor pool is determined from a plurality of discovery monitor pools based on configuration information received from a base unit.

10. The apparatus of claim 8, wherein the discovery monitor pool is determined from a plurality of discovery monitor pools based on an association between the discovery monitor pool and the discovery announcement pool.

11. The apparatus of claim 7, wherein the processor determines a second discovery announcement pool of the plurality of discovery announcement pools in response to not receiving a response to the discovery announcement signal and in response to one or more conditions being satisfied.

12. The apparatus of claim 11, wherein the one or more conditions comprise not receiving a response to the discovery announcement signal after transmitting the discovery announcement signal using the first discovery announcement pool a predetermined number of times, not receiving a response to the discovery announcement signal after a predetermined period of time, or a combination thereof.

13. The apparatus of claim 11, wherein the second discovery announcement pool is configured based on operational information.

14. The apparatus of claim 13, wherein the operational information comprises indication information received from a base unit, a remote unit capability, a remote unit power limitation, a remote unit power consumption requirement, a discovery signal coverage distance, a traffic type of subsequent data, a service type of subsequent data, a traffic priority of subsequent data, or some combination thereof.

15. A method comprising:
receiving a plurality of discovery announcement pools, wherein each discovery announcement pool of the plurality of discovery announcement pools comprises a discovery signal transmission bandwidth that has a different discovery signal transmission bandwidth than all other discovery announcement pools of the plurality of discovery announcement pools and a number of transmission subframes that has a different number of transmission subframes than all other discovery announcement pools of the plurality of discovery announcement pools; and
receiving a discovery announcement signal using a first discovery announcement pool of the plurality of discovery announcement pools.

16. The method of claim 15, wherein the first discovery announcement pool is determined based on operational information.

17. The method of claim 16, wherein the operational information comprises indication information from a base unit, a remote unit capability, a remote unit power limitation, a remote unit power consumption requirement, a discovery signal coverage distance, a traffic type of subsequent data, a service type of subsequent data, a traffic priority of subsequent data, or some combination thereof.

18. An apparatus comprising:
a receiver that:
receives a plurality of discovery announcement pools, wherein each discovery announcement pool of the plurality of discovery announcement pools comprises a discovery signal transmission bandwidth that has a different discovery signal transmission bandwidth than all other discovery announcement pools of the plurality of discovery announcement pools and a number of transmission subframes that has a different number of transmission subframes than all other discovery announcement pools of the plurality of discovery announcement pools; and
receives a discovery announcement signal using a first discovery announcement pool of the plurality of discovery announcement pools.

19. The apparatus of claim 18, wherein the first discovery announcement pool is determined based on operational information.

20. The apparatus of claim 19, wherein the operational information comprises indication information from a base unit, a remote unit capability, a remote unit power limitation, a remote unit power consumption requirement, a discovery signal coverage distance, a traffic type of subsequent data, a service type of subsequent data, a traffic priority of subsequent data, or some combination thereof.

* * * * *